United States Patent
Sevindik et al.

(10) Patent No.: US 11,457,368 B2
(45) Date of Patent: Sep. 27, 2022

(54) LICENSED ASSISTED ACCESS IN A CONVERGED NETWORK

(71) Applicant: CHARTER COMMUNICATIONS OPERATING, LLC, St. Louis, MO (US)

(72) Inventors: Volkan Sevindik, Parker, CO (US); Haider Syed, Parker, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/091,396

(22) Filed: Nov. 6, 2020

(65) Prior Publication Data

US 2022/0150712 A1    May 12, 2022

(51) Int. Cl.
*H04W 16/14* (2009.01)
*H04W 28/26* (2009.01)
*H04W 24/10* (2009.01)
*H04W 88/06* (2009.01)

(52) U.S. Cl.
CPC .......... *H04W 16/14* (2013.01); *H04W 24/10* (2013.01); *H04W 28/26* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 10,492,204 B2 | 11/2019 | Kakinada et al. | |
| 10,506,444 B2* | 12/2019 | Srikanteswara | .... H04W 52/367 |
| 2016/0227578 A1 | 8/2016 | Lee et al. | |
| 2019/0058999 A1* | 2/2019 | Gunasekara | ...... H04W 36/0022 |

FOREIGN PATENT DOCUMENTS

| | | |
|---|---|---|
| CA | 2 924 536 A1 | 4/2016 |
| EP | 3 222 097 B1 | 4/2020 |
| WO | 2018064001 A1 | 4/2018 |

\* cited by examiner

*Primary Examiner* — Adolf Dsouza
(74) *Attorney, Agent, or Firm* — Meagher Emanuel Laks Goldberg & Liao, LLP

(57) ABSTRACT

Various embodiments comprise systems, methods, architectures, mechanisms and apparatus for allocating resources in a converged network to support, illustratively, Long Term Evolution (LTE) Licensed Assisted Access (LAA) transmission for supplemental downlink mode. Various embodiments contemplate allowing LTE eNBs having CBSD capability to use spectrum normally associated with a wireless access point (WAP) if such spectrum can be made available based on, for example, WiFi spectrum or channel measurements of interference such as provided by UE proximate the WAP and connected to the CBSD.

20 Claims, 2 Drawing Sheets

- BS/ENB NODES CONNECTED TO EPC AND CONFIGURED TO SUPPORT MOBILE NETWORK SERVICES
- BS/ENB NODES CONFIGURED AS CBSD NODES ARE REGISTERED WITH SAS AND CONFIGURED TO USE CBRS SPECTRUM GRANTED BY SAS
- WAPS CONNECTED TO ACCESS NETWORK AND CONFIGURED TO SUPPORT WAP NETWORK SERVICES
- WC CONFIGURED TO MANAGE WAPS
- WC CONFIGURED TO COMMUNICATE WITH BS/ENB NODES VIA EPC  210

---

- 4G/LTE/5G AUTHENTICATION
- SUBSCRIBER QOS PER SLA
- MME RECEIVES UE IMSI AND TRACKING AREA UPDATES  225

- UE ATTACHES TO MOBILE NETWORK VIA CBSD NODE
- UE RECEIVES DATA IN DL AND TRANSMITS DATA IN UL  220

---

UE WAKES UP WIFI RADIO, MEASURES INTERFERENCE LEVEL(S) IN 5GHZ BAND, AND PROVIDES THIS MEASUREMENT TO CBSD NODE  230

---

- DL THROUGHPUT DEMAND
- AMOUNT OF SPECTRUM NEEDED BY CBSD
- TIME/DURATION OF NEED
- MEASURED INTERFERENCE LEVEL IN BAND REQUESTED
- EXPECTED QOS LEVELS  245

CBSD TRANSMITS RR REQ TO WC VIA EPC  240

---

- NUMBER OF UE CONNECTED TO WAP
- 2.6/5GHZ BAND AVAILABILITY AND INTERFERENCE LEVEL(S)  255

FOR EACH RR REQ, WC EXAMINES STATISTICS OF PROXIMATE WAP(S) TO DETERMINES IF WAP RESOURCES MAY BE ALLOCATED  250

---

- BW AMOUNT
- CHANNEL NUMBER(S)
- DURATION  265

WC TRANSMITS RR RESPONSE TO REQUESTING CBSD  260

---

- CBSD CAUSES UE TO ADD SECOND CARRIER 5GHZ DEFINED CHANNEL(S) FOR RECEIVING DL DATA FOR DEFINED DURATION
- CBSD TRANSMITS DL DATA VIA CHANNEL(S) FOR DEFINED DURATION AND THEN TRANSMITS RR END-OF-TRANSMISSION MESSAGE TO WC  270

---

FOR EACH RR EOT MESSAGE FROM A CBSD NODE, WC MARKS RR AS CONCLUDED AND RELEASES RESOURCES FOR USE IN NEXT RR REQ  280

FIG. 2  200

LICENSED ASSISTED ACCESS IN A CONVERGED NETWORK

FIELD OF THE DISCLOSURE

The present disclosure relates generally to fifth generation telecommunications systems and, more particularly, to downlink bandwidth part management in unlicensed spectrum.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Operators of mobile systems, such as Universal Mobile Telecommunications Systems (UMTSs), Long Term Evolution (LTE), and 5th Generation New Radio (5G-NR) described and being developed by the Third Generation Partnership Project (3GPP), are increasingly relying on wireless macrocell radio access networks (RANs) such as traditional cellular base stations, eNodeBs and the like, along with wireless small cell or microcell RANs in order to deploy, for example, indoor voice and data services to enterprises and other customers. For both macrocell RANs and small/micro cell RANs, increasing demands for wireless throughput make access to additional wireless spectrum desirable.

SUMMARY

Various deficiencies in the prior art are addressed by systems, apparatus, and methods for allocating resources in a converged network to support, illustratively, Long Term Evolution (LTE) Licensed Assisted Access (LAA) transmission for supplemental downlink mode. Various embodiments contemplate allowing LTE eNBs having CBSD capability to use spectrum normally associated with a wireless access point (WAP) if such spectrum can be made available based on, for example, WiFi spectrum or channel measurements of interference such as provided by UE proximate the WAP and connected to the CBSD.

Specifically, DL and/or UL traffic may be offloaded to spectrum normally associated with WiFi access points (WAPs), which spectrum is primarily found in the 5 GHz region since the 2.4 GHz region is usually congested. In this manner, the effective wireless bandwidth capacity of each eNB may be correspondingly increased. A converged mobile/WiFi networks operator may choose to use in its mobile (LTE) network some of the spectrum that is unused (available) in its WiFi network, specifically the 2.4G or 5G WiFi channels of WAPs proximate the CBSD and relevant UE A method according to one embodiment for allocating resources in a converged network comprises: receiving, at a Citizens Broadband Radio Service Device (CBSD) node in communication with user equipment (UE), a measurement of interference associated with a wireless access point (WAP) proximate the UE; determining, using the measurement of interference, that a portion of spectrum normally associated with the WAP is allowed to be used by the CBSD node for an allowed duration of time; and transmitting, toward the UE, a message configured to cause the UE to coordinate with the CBSD node in a Long Term Evolution (LTE) Licensed Assisted Access (LAA) mode to use the allowed spectrum for the allowed duration of time.

A system according to an embodiment comprises: at least one Citizens Broadband Radio Service Device (CBSD) node configured to provide network services to user equipment (UE) connected thereto; at least one wireless access point (WAP) configured to provide network services to UE connected thereto; and a WiFi controller (WC), configured to use a measurement of interference associated with a WAP proximate UE connected to a CBSD node to determine whether a portion of spectrum normally used by the WAP is allowed to be used by the CBSD node for an allowed duration of time to provide network services to UE connected to the CBSD node; the CBSD node transmitting, toward the UE, a message configured to cause the UE to coordinate with the CBSD node in a Long Term Evolution (LTE) Licensed Assisted Access (LAA) mode to use the allowed spectrum for the allowed duration of time.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 2 depicts a flow diagram of a dynamic Licensed Assisted Access (LAA) transmission resource allocation method according to an embodiment.

Figure 1:
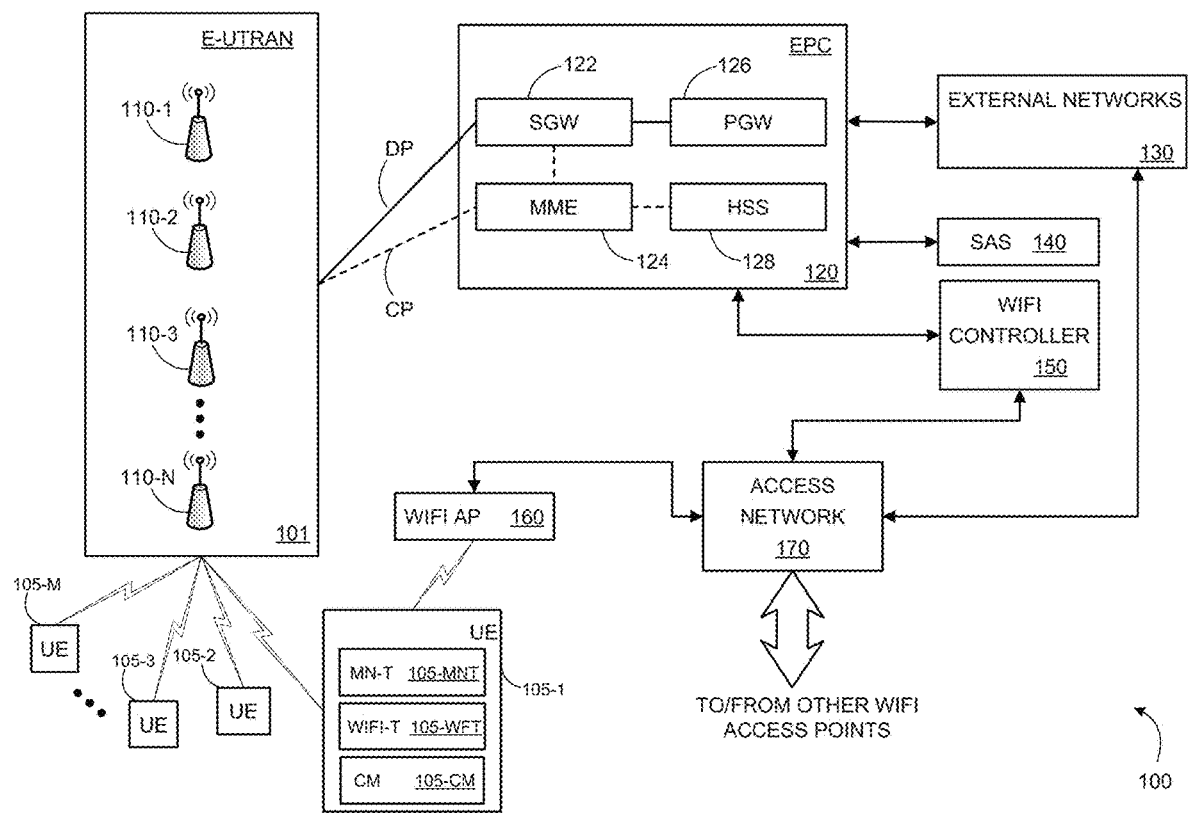
FIG. 1 depicts a block diagram of a network services architecture suitable for use in various embodiments.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments find particular utility within the context of converged networks configured to enable user equipment (UE) to access subscriber services via any of a plurality of available wireless networks as long as the QoS requirements are satisfied, such as a Wi-Fi network, 4G/LTE/5G network, unlicensed spectral regions and/or more than one network simultaneously. Unlicensed spectrum may comprise, illustratively, the Citizens Broadband Radio Service (CBRS) band at ~3.5 to 3.7 GHz which is utilized by Citizens Broadband Radio Service Devices (CBSDs) registered with a Spectrum Access System (SAS) capable of adapting CBSD operation in accordance with government requirements, network congestions, network interference and the like.

Long Term Evolution (LTE) Licensed Assisted Access (LAA) and its enhancements/further enhancements (eLAA/FeLAA) were introduced in 3GPP Releases 13-15 to specify downlink (DL) and uplink (UL) LTE operation in unlicensed spectrum, primarily 5 GHz. A similar effort is under way in Rel-16 for 5G New Radio in unlicensed spectrum (NR-U).

There are two modes of LAA; a first mode is supplemental downlink, and a second mode is DL and UL transmission. A User Equipment (UE) Wi-Fi radio wakes up at regular intervals to measure the interference level in 5 GHz and shares this information with eNB that it is currently connected to. There are different messages exchanged between eNBs and Wi-Fi controller to manage the data transmission in 5 GHz band. Unfortunately, the various standards documents do not address downlink scheduling/management issues associated with transmission in LAA mode of LTE for supplemental downlink mode.

Various embodiments contemplate enabling LTE eNBs having CBSD capability to utilize spectrum beyond that of CBRS for offloading UE downlinks (or uplinks) to WiFi networks. Specifically, DL and/or UL traffic may be offloaded to spectrum normally associated with WiFi access points (WAPs), which spectrum is primarily found in the 5 GHz region since the 2.4 GHz region is usually congested. In this manner, the effective wireless bandwidth capacity of each eNB may be correspondingly increased. A converged mobile/WiFi networks operator may choose to use in its mobile (LTE) network some of the spectrum that is unused (available) in its WiFi network, specifically the 2.4G or 5G WiFi channels of WAPs proximate the CBSD and relevant UE.

It is noted that unlicensed spectrum is subject to contention and/or interference from multiple users and equipment types. There may be contention for the spectrum from multiple network operators. Deconflicting the use of this spectrum becomes more important as it becomes more crowded with the introduction of more devices, applications, and so on.

FIG. 1 depicts a block diagram of a network services architecture suitable for use in various embodiments. Specifically, FIG. 1 depicts a converged network services architecture in which user equipment (UE) may access network services (e.g., voice, streaming media, data upload/download etc.) via either of two service provider networks; illustratively, via provider equipment (PE) implementing base stations or eNodeBs (eNBs) of a mobile network (e.g., 4G/LTE, 5G), or via PE implementing wireless access points (APs or WAPs) of a WiFi network (e.g., 802.11xx networks). In various embodiments, at least some of the eNBs of the mobile network comprise CBSDs configured to provide improved/additional services via respective allocations of CBRS spectrum, as will be discussed in more detail below.

FIG. 1 depicts a block diagram of a network services architecture suitable for use in various embodiments. Specifically, FIG. 1 depicts a converged network services architecture in which user equipment (UE) utilizing network services (e.g., voice, streaming media, data upload/download etc.) may access any available/compatible network as long as the quality of service (QoS) requirements of the relevant network services are satisfied, such as a WiFi network (e.g., 802.11xx networks) or mobile network (e.g., 4G/LTE, 5G).

Specifically, user equipment (UE) 105-1 through 105-M (collectively UE 105) are depicted as being configured for wirelessly communicating with one or more mobile network nodes 100-1 through 110-N (collectively nodes 110), the nodes 110 forming a E-UTRAN (e.g., LTE access network) 101 which is connected to an evolved packet core (EPC) 120 so as to provide thereby network services, such as from/to external networks 130. The UE 105 is also depicted as depicted as being configured for wirelessly communicating with a WiFi Access Point (WAP or AP) 160 which is connected to a WiFi Controller 150 via, illustratively, an access network 170 such as provided by a telecommunications, cable television, and/or other network services provider.

WAP 160 may comprise access points such as 802.11xx wireless access points normally deployed at home, business or other locations and configured to communicate with UE 105 and with an access network 170 (to handle backhaul and UE services delivery functions). In various embodiments, a network services provider utilizes numerous such access points distributed over a "coverage footprint" to provide network services to mobile devices such as the UE 105 discussed herein.

The nodes 110 may comprise macrocells, small cells, microcells and the like such as eNodeBs, cellular network base stations, 4G/5G repeaters, and similar types of provider equipment. The nodes 110 may include nodes that use licensed 3G/4G/LTE/5G spectrum, unlicensed spectrum such as citizens broadband radio service (CBRS) spectrum, or a combination of licensed and unlicensed spectrum. In the case of nodes 110 having Citizens Broadband Radio Service Device (CBSD) capability, allocations of CBRS spectrum are provided via a Spectrum Access System (SAS) 140.

The UE 105 may comprise any type of wireless device configured for use in accordance with the various embodiments, such as user terminals (e.g., mobile phones, laptops, tablets and the like), fixed wireless access devices (e.g., set top boxes, digital video recorders, stationary computing devices and the like), Internet of Things (IoT) devices (e.g., sensors, monitoring devices, alarm system devices and the like), and/or other wireless devices. The UE 105 may include UE that use licensed 3G/4G/LTE/5G spectrum, unlicensed spectrum such as CBRS spectrum, or a combination of licensed and unlicensed spectrum. In the case of nodes 110 having CBSD capability, allocations of CBRS spectrum are provided via 140. The various embodiments contemplate the UE are configured to communicate via at least one mobile network (MN) radio access technology (RAT) such as 3G, 4G/LTE, and 5G, and at least one WiFi access point technology such as 802.11xx (e.g., 802.11b, 802.11a, 802.11g, 802.11n, 802.11ac, 802.11ax and so on).

The UE 105 comprises a mobile network transceiver 105-MNT configured for communications with any of nodes 110, a WiFi transceiver 105-WFT configured for communication with WAP 160, and a connection manager 105-CM configured to manage communications with the nodes 110 and APs 160. The UE 105 also comprises various other components, modules, antennas, and the like (not shown).

The connection manager 105-CM may be configured to cause the UE to give priority to WiFi connections when the UE becomes IDLE in a 4G network. Further, the connection manager 105-CM may be configured to insert a UE identifier such as a international mobile subscriber identifier (IMSI) of the UE into a "Connection Information" field included within some or all of the WiFi frames transmitted to the WAP 160 so that the WAP 160 knows the IMSI of connected UE, thereby facilitating rapid migration of such UE from the WiFi network of a WAP 160 to the mobile network of a MN node 110. Other UE identifiers may also be used depending on the type of UE, provider equipment, network protocols, regulatory requirements and the like, such as a International Mobile Equipment Identity (IMEI), a mobile equipment identifier (MEID), an Electronic serial numbers (ESNs) and so on. The connection manager 105-CM may be configured to sense the type of connection or radio access network (RAN) currently used by the UE, and to store authentication, location information, subscriber identification and the like associated with the currently used RAN and any previously used RAN.

The nodes 110 are configured to communicate with user equipment (UE) 105 as discussed herein. While the nodes 110 and UE 105 may operate in accordance with various radio access technologies (RATs), the embodiments will be discussed within the context of those nodes 110 and UE 105 configured to communicate with each other as Citizens Broadband Radio Service Devices (CBSDs) configured for operation within the Citizens Broadband Radio Service (CBRS), such as the 100 MHz band from 3.55 GHz to 3.65 GHz, the 150 MZ band between 3.55 GHz and 3.70 GHz, or some other spectral range as defined by the relevant authorities.

As depicted, the EPC 120 comprises four network elements; namely, a Serving Gateway (SGW) 122, a Mobility Management Entity (MME) 124, a Packet Data Network (PDN) Gateway (PGW) 126, and a Home Subscriber Server (HSS) 128. Other network and management elements are typically included within or used to manage an evolved packet core and related communications therewith as will be known to those skilled in the art.

The SGW 122 and PGW 126 handle user data or data plane (DP) functions; they transport the internet protocol (IP) data traffic (i.e., incoming and outgoing packets) between the User Equipment (UE) 105 and the external networks 130. The external networks 130 may comprise any external network, such as an IP Multimedia Core Network Subsystem (IMS).

The SGW 122 is a point of interconnect between the radio-side (e.g., via a backhaul connection to the E-UTRAN 101 as depicted or some other wireless network) and the EPC 120. As its name indicates, this gateway serves the UE by routing the incoming and outgoing IP packets. The SGW 122 is the anchor point for intra-LTE mobility (i.e. in case of handover between eNodeBs 110) and between LTE and other 3 GPP accesses. The SGW 122 is logically connected to the PGW 126.

The PGW 126 is the point of interconnect for routing packets between the EPC 120 and external packet data networks (e.g., Internet Protocol (IP) networks) 330. The PGW also performs various functions such as IP address/IP prefix allocation, policy control and charging, and other functions.

The MME 124 and HSS 128 handle user signaling or control plane (CP) functions; they process signaling related to mobility and security for E-UTRAN 101 access. The MME 124 is responsible for the tracking and the paging of UE in idle-mode. It is the termination point of the Non-Access Stratum (NAS). The HSS 128 comprises a database that contains user-related and subscriber-related information, and provides support functions in mobility management, call and session setup, user authentication, access authorization, and other functions. It is noted that the SGW 122 may also be used to handle some control plane signaling in various configurations.

An EPC control plane signaling path CP may be used to provide information such as UE messages or signaling may be provided to the MME 124 or SGW 122. The MME 124 may also interact with various other EPC nodes such as the HSS 128 and SGW 122 to determine information helpful in generating reports and/or providing other information for managing the various networks in implementing the embodiments described herein.

As depicted in FIG. 1, a Spectrum Access System (SAS) 140 communicates with the EPC 120 and is configured to control access to the CBRS frequency band for RANs and other CBSD devices such as nodes 110 and UEs 105. Generally speaking, the SAS 140 is configured to ensure that the CBRS frequency band is allocated in accordance with the regulations promulgated by the relevant authorities. The SAS 140 may also communicate with the network manager 150 to perform various tasks in accordance with the embodiments.

As depicted in FIG. 1, a WiFi controller (WC) 150 communicates with a WiFi Access Point (WAP or AP) 160 via an access network 170. For simplification of the discussion, only one WAP 160 is shown in FIG. 1 as communicating with WiFi controller 150, and only one UE 105 (i.e., UE 105-1) is shown in FIG. 1 as communicating with that WAP 160. The WiFi controller 150, which may be implemented via a general purpose computer server, network operations center (NOC) equipment, or other provider equipment, is configured to perform various WiFi control functions associated with a large number of APs 160, as well as an even larger number of UEs 105 configured to communicate with the various APs 160.

The WC 150 may include a WiFi resource management mechanism which manages the coverage, the capacity, and/ or other characteristics of individual WAPs 160 in order to optimize the quality of the services delivered to UE 105 via the WAPs 160. The population of WAPs to be managed may run into the tens or hundreds of thousands, including WAPs that support both private and public WiFi access. Each WAP is associated with a maximum number of WiFi users (UE) that may be connected at any given time. Each connected user must be managed by the WAP. Further, since each WAP may provide one or more carrier signals having formed thereon respective communications channels (illustratively, eleven in basic 802.11 schemes), each WAP must also manage its various channels including inter-channel interference and the like (e.g., by selecting the channels experiencing the least amount of interference).

Generally speaking, the WiFi controller (WC) 150 manages various operational aspects of the WAPs 160 and UE 105 connected thereto in accordance with WAP policies, subscriber/user profiles (e.g., such as defined in service level agreements) and the like. For example, each UE may be associated with a corresponding subscriber/user profile having defined therein guaranteed minimum levels of service, such as a minimum WAP download (DL) throughput, minimum upload (UL) throughput, and/or other minimum QoS levels.

The system 100 of FIG. 1 contemplates UE 105 associated with a network services provider capable of providing network services via either of a mobile network (e.g., 3G/4G/LTE/5G network) or a WiFi network (e.g., 802.11xx network). The WC 150 is configured to enable UE 105 to receive the appropriate QoS when connected to a WAP 160 (e.g., per subscriber policy), and that the WAP 160 is configured to provide the appropriate QoS to the UE 105.

In various embodiments, the WC 150 may be configured to communicate with nodes 110 directly or via the EPC 120 (e.g., the MME 124). For example, a node 110 may communicate with the WC identify unused or underused spectrum in the WiFi network (e.g., unused 5 GHz WiFi channel) that the node 110, operating as a CBSD node, may treat as unlicensed spectrum to provide improved/enhanced services to UE connected to the node 110. While primarily contemplated as LTE LAA DL services, it is noted that UL services may also be used within the context of WiFi spectrum allocated to a CBSD node via a WC defining or identifying an allowed spectral region and an allowed duration within which the CBSD node may use the identified/allowed spectral region, as will be described in more detail below with respect to FIG. 2.

Various elements or portions thereof depicted in FIG. 1 and having functions described herein are implemented at least in part as computing devices having communications capabilities, including for example the UE 105, nodes 110, SAS 140, WC 150, WAP 160 and various portions of the EPC 120. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

CBSD Registration & Deregistration

Generally speaking, before a new CBSD (e.g., a node 110 being added to the network 101) can transmit in the CBRS frequency band, it needs to register with the SAS 140. The CBSD sends a registration request to the SAS 140 containing information about its installation parameters, such at the owner, location, and transmit characteristics of a node 110. The SAS 140 responds to the CBSD with a registration response. If the SAS 140 approves the registration request, then the SAS 140 will respond with a CBSD ID, and the CBSD is registered. If the SAS 140 rejects the registration request, then the SAS 140 will respond with an error message. The CBSD needs to correct the error and send another registration request.

Normally the CBSD requires CPI validation. In a single-step registration process, the CPI provides the installation parameters of the CBSD (signed with its own CPI certificate) to the CBSD. Then, the CBSD sends a registration request to the SAS including the signed installation parameters in a "cpiSignatureData" field. In a multi-step registration process, the CPI uses the SAS Portal (or another user interface that's integrated with the SAS Portal) to send the installation parameters to the SAS. Then, the CBSD sends a registration request to the SAS without installation parameters. The SAS combines the information from the SAS Portal and the CBSD to process the registration request.

If a CBSD needs to be decommissioned or simply moved, it will first send a deregistration request to the SAS. Thereby indicating that the CBSD no longer wishes to be listed in the SAS with the parameters that it sent in its registration request. If a CBSD subsequently needs to transmit again, then the CBSD may send a registration request with updated parameters later. Therefore, in operation a CBSD such as a node 110 registers with the SAS 140 (directly or via PE such as a network manager) by providing the SAS 140 with location and capability information as discussed above.

A UE wireless device such as a user terminal, fixed wireless access device, IoT device or other UE waits for authorization from its corresponding CBSD (e.g., corresponding node 110) before transmitting in the CBRS frequency band. Each CBSD such as a node 110 operating within the CBRS frequency band will transmit and receive wireless data within one or more respective coverage areas as discussed above, wherein some of the coverage areas may be overlapping.

FIG. 2 depicts a flow diagram of a dynamic Licensed Assisted Access (LAA) transmission resource allocation method according to an embodiment. The method 200 of FIG. 2 contemplates various functions performed by UE 105, nodes 110, SAS 140, WC 150, WAP 160, and other functional entities as described above with respect to FIG. 1. Generally speaking, the method 200 of FIG. 2 is directed to a converged network wherein network management equipment is configured to share at lest some control/management information, such as described above with respect to FIG. 1 and herein with respect to FIG. 2.

At step 210, several initial network conditions are described. Specifically, base station (BS) or eNodeB (eNB) nodes are connected to an evolved packet core (EPS) and configured to support mobile network services delivery to UE, thereby forming a mobile network such as described above with respect to FIG. 1. At least some of the eNB nodes are configured as CBSD nodes, are registered with an SAS, and are further configured to use CBRS spectrum granted by the SAS.

Further, a number of wireless access points (WAPs) are connected to one or more access networks and configure support WAP network services delivery to UE, thereby forming a WAP network such as described above with respect to FIG. 1.

Further, a WiFi controller is configured to manage the many WAPs forming the WAP network, and is configured to communicate with CBSD nodes such as via the EPC, such as eNB nodes configured as CBSD nodes.

At step 220, UE attaches to the mobile network via a CBSD node 110 (e.g., UE 105 attaches to a node 110 of a 4G/LTE, or 5G mobile network). Referring to box 215, the attachment comprises various known steps such as the UE being authenticated by the mobile network, and the UE being associated with a subscriber having a service level agreement (SLA) defining quality of service (QoS) and other metrics of network services to be provided to the subscriber's UE. In various embodiments, the international mobile subscriber identifier (IMSI), International Mobile Equipment Identity (IMEI), and/or other identifier of the UE and other information is provided to the MME, along with the current tracking area of the UE, which is periodically updated as the UE location moves between different nodes 110 or sectors thereof. Other functions are also contemplated during this attachment as is known.

At step 230, one or more UE attached to a CBSD node periodically wakes up its WiFi radio to measure one or more interference levels in the 5 GHz band, and to provide these one or more measurements to the connected CBSD node. In various embodiments, the UE measures a broad area proximate the 5 GHz band, smaller segments of the 5 GHz band, interference at some or all of the plurality spectral regions associated with respective WiFi channels, and/or some other regions or combination of regions. The measured interference may comprise any type of radio frequency (RF) interference, such from other sources of RF energy (e.g., other devices operating properly in the spectral region, or even leaking RF energy in the region), other RF communication devices, other WAPs, other WiFi channels on the same WAP (e.g., adjacent channel or co-channel interference), and so on. Measured interference may be expressed in terms of power, signal to noise ration (SNR) and so on. Interference may be measured by proxy, such as with respect to an amount of error correction exceeding that normally associated with a nominal (good) bit error rate. Many and various interference measurement types/levels are suitable for use within the context of the various embodiments.

At step 240, the CBSD node transmits a resource reservation (RR) request to the WiFi controller via, illustratively, the EPC. Referring to box 245, the RR Request may comprise a download (DL) throughput demand, an amount of 5 GHz spectrum needed or desired for use by the CBSD node (e.g., measured in multiples of 20 GHz, 10 GHz, 5 GHz and the like), a time or duration of the need (e.g., measured in milliseconds, seconds, etc.), one or more measured interference levels associated with UE to which the bandwidth allocation will be provided by the CBSD node, any expected QoS levels and, optionally, other criteria.

At step 250, the WiFi controller receives RR requests from the CBSD node and other CBSD nodes in the mobile network. For each RR request, the WC examines the statistics of any WAPs proximate the CBSD node to determine if nominally WAP resources are underutilized such that they may be reallocated to the CBSD node. Referring to box 255, such statistics include a number of UE connected to the WAP, 5 GHz band availability (optionally 2.4 GHz band availability), and interference in the 5 GHz and/or 2.4 GHz bands.

If the WC determines that one or more WiFi channels in the 5 GHz or 2.4 GHz are unused, then there is an opportunity to allocate the spectral region associated with those unused channels to the CBSD node, such as for transmission in LAA mode of LTE for supplemental downlink mode to UE (it is noted that both DL and UL modes may benefit, though the typical use case will be DL).

In various embodiments, the WAPs are configured to retrieve Received Signal Strength Indicator (RSSI) measurements from the various UE connected thereto to identify signal strength levels in the various channels. It is noted that RSSI provides a wideband power measurement useful in determining an amount of interference in a channel where it is measured. In various embodiments, if the RSSI associated with a channel is greater than a threshold level then that channel is determined to have interference and, therefore, likely not allocable to a CBSD node.

In various embodiments, an eNB is able to utilize substantially all of the bandwidth available at a WAP. This available bandwidth may be assigned to the eNB in small portions of channel capacity (e.g., sub-channel or smaller in size), in channel-sized portions of channel capacity, or in some other sized portion of available capacity/bandwidth. For example, assuming an available capacity/bandwidth of 120 MHz in a 2.4 GHz channel having 6 RF subchannels of 20 MHz each, the WAP may be configured to measure the interference at each of 20 MHz RF subchannels and assign capacity/bandwidth in 20 MHz partitions. If there are two 20 MHz channels having no or sufficiently low interference levels (e.g., associated with RSSI below a threshold amount), then an illustrative assignment of 2×20 MHz or 40 MHz of BW may be made to the CBSD. Other variations are also contemplated by the inventors.

It is noted that the number of collisions (multiple UEs trying to simultaneously access a channel) in a particular 20 MHz channel, such as a 2.4 GHz subchannel, may be measured directly or indirectly by the WAP. The higher the number of collisions in a channel, the higher the interference in that channel. Therefore, in various embodiments the number of collisions in a channel over a predefined period of time (e.g., collision rate) may be used to define channel interference, wherein a channel having a number of collisions within a predefined period of time exceeding a threshold number of collisions may be deemed to exhibit channel interference and, therefore, likely not allocable to a CBSD node.

Thus, in various embodiments, the WC determines allocable WAP resources in accordance with relevant information received from directly or indirectly from WAPs 160, UE 105. Such relevant information comprising any information useful in assessing channel and/or subchannel capacity current or predicted capacity, utilization level, congestion level, error count or rates, collision count or collision rate and/or any other mechanism suitable for directly or indirectly measuring or inferring an interference level associated with a spectral region(s), or other indication of whether the spectral region is suitable for allocation to a CBSD.

At step 260, the WC transmits a RR response to the requesting CBSD node including (referring to box 265) a bandwidth amount that the CBSD node may use and the channel number(s) associated with the spectrum within which the BW is located (identified or allowed spectrum), and a time interval or duration within which the CBSD node may use the identified spectrum (allowed duration).

At step 270, in response to receiving the RR response from the WC, the CBSD node transmits a message to the relevant UE configured to cause the UE to add second carrier 5 GHz channel(s) for receiving DL data and/or transmitting UL data for the allowed duration. The CBSD node at the start of the time interval (allowed duration) begins to transmit the DL data to the UE and/or wait for any transmitted UL data from the UE. After the time interval (allowed duration) expires, the CBSD node stops using the identified/allowed spectrum.

At step 280, the CBSD node transmits an end-of-transmission (EOT) message to the WC, which responsively marks the respective RR as concluded and releases any resources for use in a subsequent RR (assuming that WiFi connected UE are not in contention for such resources when the next RR is processed by the WC).

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method for allocating resources in a converged network, comprising:
    receiving, at a Citizens Broadband Radio Service Device (CBSD) node in communication with user equipment (UE) attached thereto, a measurement from the UE of interference associated with a wireless access point (WAP) proximate the UE;
    transmitting, from the CBSD node toward a WiFi controller (WC), a resource reservation (RR) request including the measurement of interference;
    receiving, at the CBSD node, a RR response indicating that a portion of spectrum normally associated with the WAP is allowed to be used by the CBSD node for an allowed duration of time; and
    transmitting, toward the UE, a message configured to cause the UE to coordinate with the CBSD node in a Long Term Evolution (LTE) Licensed Assisted Access (LAA) mode to use the allowed spectrum for the allowed duration of time.

2. The method of claim 1, wherein the measurement of interference is received from the UE.

3. The method of claim 2, wherein the measurement of interference is generated by the UE measuring interference via a WiFi radio.

4. The method of claim 3, wherein the WiFi radio is used to measure interference associated with at least one of 5 GHz spectral region activity, 2.4 GHz spectral region activity, and WiFi channel spectral region activity.

5. The method of claim 4, wherein the measurement of interference comprises one or more Received Signal Strength Indicator (RSSI) measurements, and wherein a RSSI exceeding a threshold level is indicative of a spectral region not being allowed to be used by the CBSD.

6. The method of claim 1, wherein the measurement of interference further comprises a collision rate, wherein a collision rate exceeding a threshold level is indicative of a spectral region not being allowed to be used by the CBSD.

7. The method of claim 1, wherein the a portion of spectrum normally associated with the WAP and allowed to be used by the CBSD node for an allowed duration of time comprises a spectral region associated with one or more WiFi channels underutilized by the WAP.

8. The method of claim 1, wherein the RR request comprises at least one of a DL throughput demand, an amount of spectrum needed, a duration of time the spectrum is needed, at least one measured interference level associated with a WAP proximate the CBSD node, and an expected Quality of Service (QoS).

9. The method of claim 8, wherein the RR response is indicative of an allowed spectral region for use by the CBSD node and an allowed duration for the CBSD to use the allowed spectral region.

10. The method of claim 8, wherein the CBSD provides mobile network services to UE via an evolved packet core (EPC), and the CBSD communicates with the WC via provider equipment (PE) associated with the EPC.

11. The method of claim 1, further comprising transmitting toward the WC an end-of-transmission (EOT) message after the expiration of the allowed duration, the EOT message configured to cause the WC to release the WAP resources.

12. The method of claim 11, further comprising:
    determining, at the WC and using statistics associated with a WAP proximate the CBSD, whether any resources associated with the WAP are available for use by the CBSD; and
    transmitting, toward the CBSD node, the RR response indicative of an allowed spectral region for use by the CBSD node and an allowed duration for the CBSD to use the allowed spectral region.

13. The method of claim 11, wherein the WC is configured to sequentially process each of a plurality of RR requests.

14. The method of claim 12, wherein the WC is configured to sequentially process each of a plurality of RR requests from multiple CBSD nodes in communication with respective groups of UE.

15. The method of claim 1, wherein the CBSD node and UE operate in a supplemental downlink mode of LAA.

16. A system, comprising:
- at least one Citizens Broadband Radio Service Device (CBSD) node configured to provide network services to user equipment (UE) attached thereto;
- at least one wireless access point (WAP) configured to provide network services to UE connected thereto; and
- a WiFi controller (WC), configured to receive a resource reservation (RR) request including a measurement of interference associated with a WAP proximate UE attached to a CBSD node to determine whether a portion of spectrum normally used by the WAP is allowed to be used by the CBSD node for an allowed duration of time to provide network services to UE attached to the CBSD node, and configured to transmit a RR response indicating an allowed portion of spectrum and allowed duration of time;
- the CBSD node transmitting, toward the UE, a message configured to cause the UE to coordinate with the CBSD node in a Long Term Evolution (LTE) Licensed Assisted Access (LAA) mode to use the allowed spectrum for the allowed duration of time.

17. The system of claim 16, wherein a WiFi radio of UE proximate the WAP and attached to the CBSD node is used to measure interference associated with at least one of 5 GHz spectral region activity, 2.4 GHz spectral region activity, and WiFi channel spectral region activity.

18. The system of claim 16, wherein the measurement of interference comprises one or more Received Signal Strength Indicator (RSSI) measurements, wherein a RSSI exceeding a threshold level is indicative of a spectral region not being allowed to be used by the CBSD.

19. The system of claim 16, wherein the measurement of interference comprises a WiFi channel collision rate, wherein a collision rate exceeding a threshold level is indicative of a spectral region not being allowed to be used by the CBSD.

20. A tangible and non-transitory computer readable storage medium storing instructions which, when executed by a computer, adapt the operation of the computer to provide a method for allocating resources in a converged network, the method comprising:
- receiving, at a Citizens Broadband Radio Service Device (CBSD) node in communication with user equipment (UE) attached thereto, a measurement of interference associated with a wireless access point (WAP) proximate the UE;
- transmitting, from the CBSD node toward a WiFi controller (WC), a resource reservation (RR) request including the measurement of interference;
- receiving, at the CBSD node, a RR response indicating that a portion of spectrum normally associated with the WAP is allowed to be used by the CBSD node for an allowed duration of time; and
- transmitting, toward the UE, a message configured to cause the UE to coordinate with the CBSD node in a Long Term Evolution (LTE) Licensed Assisted Access (LAA) mode to use the allowed spectrum for the allowed duration of time.

* * * * *